Patented Dec. 25, 1951

2,579,531

UNITED STATES PATENT OFFICE 2,579,531

PROCESS FOR EXTRACTING GOLD AND SILVER

John Benjamin Zadra, Reno, Nev., assignor to the United States of America as represented by the Secretary of the Interior No Drawing. Application November 16, 1949, Serial No. 127,761

2 Claims. (Cl. 204—109)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to the recovery of precious metals from cyanide solutions thereof, and, more particularly, relates to the regeneration of activated carbon employed in adsorbing gold and silver from cyanide solutions or pulps.

Heretofore, by means of the so-called "Chapman" process, the gold and silver content of ores have been dissolved into a cyanide solution, for example, a dilute solution of sodium cyanide, and thereafter the dissolved gold and silver have been recovered by passing the cyanide solution into contact with activated carbon. The activated carbon has the property of adsorbing the precious metal values from the cyanide solution. When a sufficient quantity of gold and silver is adsorbed upon the activated carbon to "load" the same, it has been customary to ship the activated carbon to the smelter and replace it with fresh activated carbon. Obviously, the cost of activated carbon represents a considerable item of expense in this process. It would be highly desirable to provide a way to remove the adsorbed gold and silver and thus regenerate the activated carbon for further use in the adsorption of additional quantities of gold and silver. Such a regenerative process is provided by this invention.

Accordingly, this invention has for an object the provision of a process for regenerating the activated carbon used in the adsorption of precious metal values while recovering such values in a convenient form. Another object of this invention is to provide suitable means for separately recovering the gold and silver values adsorbed upon activated carbon. Another object is to provide a cyclic process wherein, with suitable regeneration steps, the activated carbon containing adsorbed gold and silver is made available for reutilization and the intermediate solutions employed to regenerate the said activated carbon are themselves available for regeneration and reuse in the process. Other related objects will be apparent or will appear hereinafter as the ensuing description proceeds.

These objects are accomplished in accordance with this invention which provides a process for regeneration of activated carbon loaded with adsorbed gold and silver while recovering the same, wherein such loaded carbon is first treated with a caustic solution of sodium sulfide to extract the gold therefrom and then the activated carbon, now low in gold content, is treated with sodium cyanide solution to dissolve and recover the silver content thereof in solution. The activated carbon is then available for reutilization in the adsorption of more precious metals, and the caustic sodium sulfide solution containing gold is stripped of its gold content by electrolysis between an insoluble anode and a pre-coated charred excelsior cathode whereby the gold in solution is deposited on the charred excelsior, then sodium sulfite is added to the stripped caustic sodium sulfide solution to neutralize the formed polysulfides, and the thus regenerated caustic sodium sulfide solution is returned for the treatment of more loaded activated carbon as before.

The cyanide solution containing the dissolved silver from the above-mentioned step may be electrolyzed in conventional fashion to recover the silver content thereof. In some cases, it may be desirable to produce a dore bullion and to forego the sodium sulfide extraction step.

It will be seen that the foregoing process provides a means for transferring adsorbed precious metal values from a large quantity of activated carbon to a very minute quantity of charred excelsior. As an example, only about 1 to 3% by weight of charred excelsior is required, based on the weight of the activated carbon regenerated. Since charred excelsior is itself a very inexpensive material while activated carbon is both bulky and expensive, it is seen that substantial economies are provided by the instant process.

While it is not desired to limit the invention by any particular theory of reaction, from the best evidence available it appears that the loaded activated carbon when leached with a caustic sodium sulfide solution gives up its gold content with the formation of gold pentasulfide. Upon electrolysis of a gold pentasulfide solution, the dissolved gold can be visualized as existing in solution in equilibrium between gold pentasulfide and sodium thioaurate according to the following equation:

$$Au_2S_5 + 3Na_2S = 2Na_3AuS_4$$

However, the sodium thioaurate is readily dissociated in solution as follows:

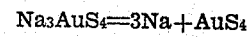

$$Na_3AuS_4 = 3Na + AuS_4$$

The action of the electric current consists essentially in the decomposition of the sodium sulfide thus—

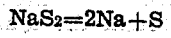

$$NaS_2 = 2Na + S$$

and the deposition of gold upon the cathode results from a secondary reaction of discharged sodium ions upon the sodium thioaurate—

$$Na_2AuS_4 + 5Na = Au + Na_2S$$

As the anode, it is believed that in the first stages of electrolysis only sulfur ions from the sodium sulfide are there discharged and as fast as sulfur is set free it combines with dissolved sodium sulfide to form sodium polysulfides, thus—

$$Na_2S + S = Na_2S_2$$

Later on, oxygen is liberated at the anode which also acts upon sodium hydrogen sulfide to form polysulfides, thus—

$$6NaSH + 3O + 3Na_2S_2 = 3H_2O$$

The polysulfides formed at the anode gradually diffuse during the process of electrolysis and when a polysulfide reaches the cathode the deposited gold begins to redissolve in accordance with the following equation—

$$2Au + 3Na_2S_2 = 2Na_3AuS_3$$

Obviously, deposition of gold would cease if the above redissolution of deposited gold were allowed to proceed; accordingly, it has been found that the incorporation of sodium sulfite in the electrolyte in small amounts causes the sodium polysulfide to react therewith and regenerate sodium sulfide while liberating a proportion of sodium thiosulfate. Tests conducted so far have established that the caustic sodium sulfide leaching solution can be reused after regeneration for at least 10 cycles and probably can be used for many more cycles than that. From theoretical considerations it is probable that the caustic sodium sulfide solution can be reutilized until it becomes saturated with sodium thiosulfate produced in the regeneration of sodium sulfides from sodium polysulfides by reaction with sodium sulfite.

A suitable caustic alkali sulfide leaching solution for the initial leaching of the loaded activated carbon is a dilute solution of sodium sulfide containing caustic soda. In general, the solution should contain from 1 to 5% sodium sulfide and from 2 to 8% sodium hydroxide. Preferably, the caustic sodium sulfide solution is maintained at a content of about 3% sodium sulfide and 4% sodium hydroxide based on total weight of solution. In general, for each part by weight of pregnant or loaded activated carbon there is employed about an equal part by weight of caustic sodium sulfide solution. An excess of caustic sodium sulfide solution is not harmful but large excesses require additional electrolytic equipment. To some extent the quantity of caustic sodium sulfide employed depends upon the quantity of gold contained in the activated carbon being regenerated. Upon completion of the leaching of the activated carbon with the caustic sodium sulfide solution, the activated carbon is preferably washed with water before returning it to the adsorption of further quantities of gold from the mill circuit. If there are substantial quantities of silver also adsorbed upon the activated carbon then the carbon is additionally leached or extracted with sodium cyanide solution, preferably, a hot 1/10% sodium cyanide solution containing 1% by weight of caustic soda. During the course of this extraction, the sodium cyanide solution becomes pregnant with silver cyanide, which is then preferably electro-deposited upon a charred excelsior cathode from the cyanide solution in a manner similar to that employed for the gold electrodeposition step. However, the silver readily deposits from a cyanide solution upon a charred excelsior cathode without initially precoating the cathode.

After additionally washing the activated carbon to remove the silver cyanide therefrom, it is returned to the mill circuit for further adsorption of gold and silver. Experience has demonstrated that this cycle can be repeated at least twenty times before the activated carbon begins substantially to lose its adsorptive powers for precious metal values. In other words, by this invention 100 lbs. of activated carbon does the work that was formerly accomplished by a ton of this material.

One of the important features of this invention involves stripping the gold electrolytically from the caustic sodium sulfide solution. This is accompanied by passing an electric current between an insoluble anode and an insoluble cathode through the auriferous sodium sulfide solution. In general, a voltage of 2 to 6 volts, preferably about 3 volts, has been found satisfactory.

A suitable anode is one which does not dissolve in a caustic sodium sulfide solution, and in the operation of this invention, it has been found that 16 mesh stainless steel screen cloth is entirely satisfactory. In order to insulate the screen cloth from the electrolytic cell walls and at the same time restrain the cloth in a plane parallel relationship, it has been found desirable to mount the stainless steel screen cloth in a hard rubber frame of conventional type.

The cathode which has been found highly satisfactory comprises charred excelsior. As is well known, this can be prepared by suitably compressing wood shavings or turnings in a receptacle and thereafter heating to charring temperature with the exclusion of air. There results an open or filigree mass of carbon containing a small amount of ash. Obviously, for practical application, the charred excelsior must be restrained in a container and suitable means for conducting the electrolytic current therethrough must be provided. It has been found that perforated hard rubber box or receptacle is entirely satisfactory, and, in general, the thickness of the receptacle is made small relative to its length and width. In order to distribute the electric current through the charred excelsior, it has been found that a stainless steel bus bar having dependent wires in the form of a comb inserted through the mass of charred excelsior provides a suitable corrosion-resistant means for introducing the electric current into the charred excelsior.

For stripping the silver from a silver cyanide solution the charred excelsior cathode operates in an entirely satisfactory manner right from the beginning of the electrolysis. However, since its electrical resistance is relatively high, for best results in the stripping of the gold from the sodium sulfide solution, it is preferable to precoat the charred excelsior in an auxiliary cell. This is accomplished by employing the charred excelsior, suitably restrained in a perforated hard rubber frame, as the cathode in a sodium cyanide solution containing dissolved gold. Initially a voltage of about 6 volts is required to deposit the gold upon the charred excelsior; however, as soon as a sufficient amount of gold has been deposited, the cell voltage required drops to about 3 volts. At this time the charred excelsior has been sufficiently precoated for employment, after washing with water, as the cathode in the stripping of the caustic sodium sulfide solution.

The following example illustrates how this invention may be carried out, but it is not limited thereto:

50 lbs. of pregnant activated carbon, assaying 232 ounces of gold per ton and 0.8 ounce of silver per ton, is leached with 100 liters of a solution containing 3% by weight of sodium sulfide and 4% by weight of sodium hydroxide. After extraction of the gold content by this leach, the caustic sodium sulfide solution is stripped of its gold content by electrolysis between a stainless steel screen anode as above described and a charred excelsior cathode restrained in a perforated rubber frame as above described. The cathode has been precoated by electrolysis in a gold cyanide solution until its resistance dropped to the point where only 3 volts were required to secure a satisfactory rate of gold deposition. A voltage of 3 volts was impressed and the current density adjusted to yield a current density of 9 amperes per square foot of external cathode area. The gold is stripped from the sodium sulfide solution, at the rate of 6½ grams of gold per hour per square foot of cathode surface (since a charred excelsior cathode has an extremely extensive surface not susceptible of calculation, for the purposes of the foregoing definition, cathode surface is considered to be exterior surface restrained within the hard rubber perforated frame).

As soon as the caustic sulfide solution is stripped of its gold content, it is analyzed by methods known to those skilled in the art for its content of sulfide sulfur and its content of polysulfide sulfur. The concentration of sulfide sulfur calculated as sodium sulfide is adjusted by the addition of additional sodium sulfide to equal 30 grams per liter (3%). Sufficient sodium sulfite is added to react completely with the analyzed content of polysulfide to regenerate sodium sulfide therefrom as hereinabove described. In general, for each cycle of operation, the addition of about 5 grams per liter of sodium sulfide and about 2.5 grams per liter of sodium sulfite suffices to bring the caustic sodium sulfide back to its optimum strength.

After conclusion of the gold deposition upon the charred excelsior cathode, the cathode is washed with water and the gold-containing charred excelsior is placed in a graphite crucible with borax and soda ash for fluxing purposes and heated to the fusion temperature of gold. During this procedure the charred excelsior is first burned off and the gold sponge reduced to a high purity bullion without further treatment.

After removal of the gold from the activated carbon and washing with water, the silver content thereof, when sufficiently high, is dissolved with an excess of 1/10% of sodium cyanide solution containing 1% by weight of caustic soda. For the extraction of 25 lbs. of activated carbon, 50 liters of the 1/10% caustic sodium cyanide solution is heated to boiling and circulated over silver-bearing activated carbon until all the silver has been leached out. The pregnant silver cyanide solution is then subjected to electrolysis as above described for the pregnant auriferous sodium sulfide solution and the silver recovered upon a charred excelsior cathode. No precoating of the charred excelsior however is necessary in the electrolysis of the silver cyanide solution.

It will be seen from the foregoing description that this invention provides an easily operated and simple means for transferring the precious metal content of adsorbent carbon onto a very small amount of charred excelsior. By the practice of this invention, the adsorbent carbon may be reused in the mill cyanide circuit at least 20 cycles, whereas heretofore only one cycle was available. The precious metal content in the form of a gold bullion, a silver bullion or a dore bullion is secured without requiring anything but small-sized equipment. Thus, by the practice of this invention, marked economies result in the production of gold and silver.

While the invention has been particularly described with reference to the employment of sodium cyanide and caustic soda, obviously other alkali metal cyanides and other alkali metal hydroxides may be employed where they are more economically utilized than the specified compounds. For example, caustic potash and potassium sulfide can be used in place of caustic soda and sodium sulfide.

One of the marked features of this invention is the reutilization of the sodium sulfide-caustic soda extraction liquor for as many as ten or more extraction cycles by virtue of the regeneration process provided by this invention. It is only necessary to incorporate a small quantity of sodium sulfite during or after the electrolysis whereby the formed polysulfides are neutralized.

Various changes will be apparent to one skilled in the art; consequently, the foregoing description should be construed as setting forth the principle of the invention and not by way of limitation thereon.

What is claimed is:

1. A cyclic process for regenerating activated carbon loaded with adsorbed gold while recovering the same, which comprises first treating such carbon with a caustic solution of sodium sulfide to extract the gold therefrom, separating the thus-regenerated active carbon, stripping the gold from the pregnant caustic sodium sulfide solution by electrolysis between an insoluble anode and a pre-coated charred excelsior cathode, recovering the deposited gold, then adding sodium sulfite to react with the formed polysulfide to regenerate the caustic sodium sulfide solution for reuse in the process, said cathode having been pre-coated by electrodepositing gold therein from a cyanide solution.

2. The process of claim 1 wherein the activated carbon also contains adsorbed silver, which comprises treating such carbon after the gold removal step, with sodium cyanide solution to separate and recover the silver content thereof.

JOHN BENJAMIN ZADRA.

REFERENCES CITED

The following references are of record in the file of this patent:

UNITED STATES PATENTS

| Number | Name | Date |
|---|---|---|
| 292,605 | Williams | Jan. 29, 1884 |
| 591,571 | Richards et al. | Oct. 12, 1897 |
| 2,273,569 | Williams | Feb. 17, 1942 |
| 2,478,652 | Byler et al. | Aug. 9, 1947 |

OTHER REFERENCES

J. W. Mellor, Comprehensive Treatise on Inorganic and Theoretical Chemistry, vol. 2 (1922), page 640.

Technical Paper No. 378 by Gross and Scott published 1927, by U. S. Bureau of Mines, pages 46, 52, 53.